(No Model.)
J. E. GROSE.
HITCHING DEVICE FOR VEHICLES.
No. 372,311. Patented Nov. 1, 1887.
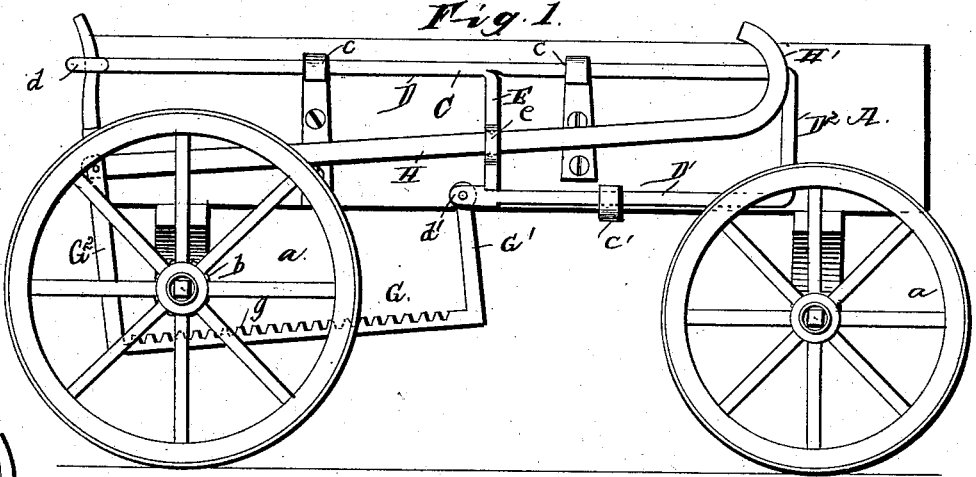
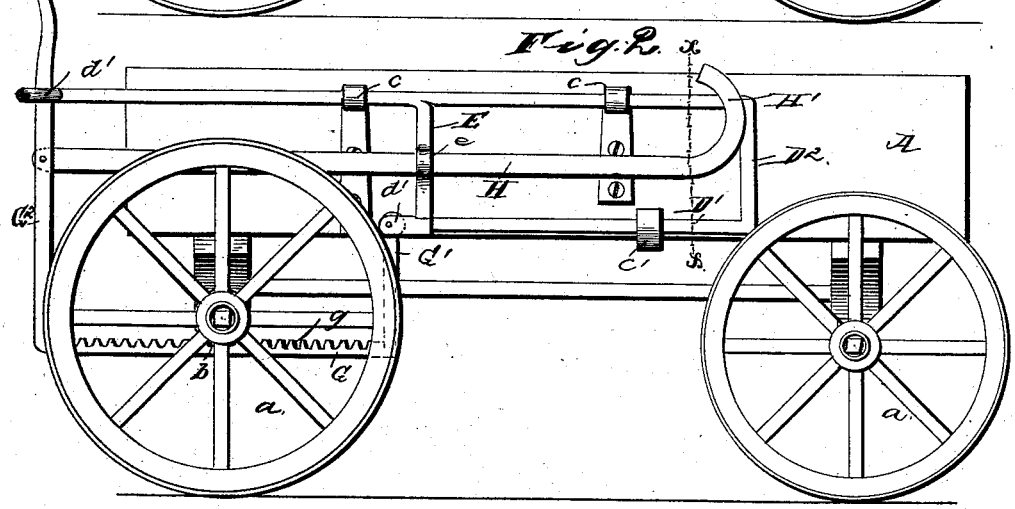
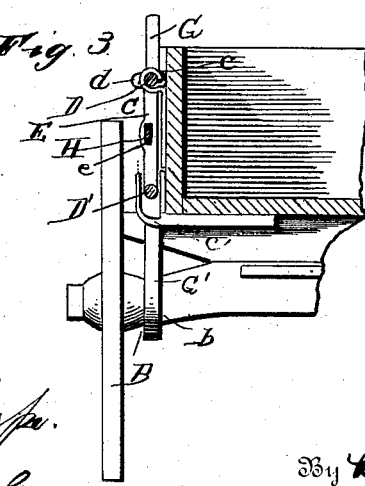
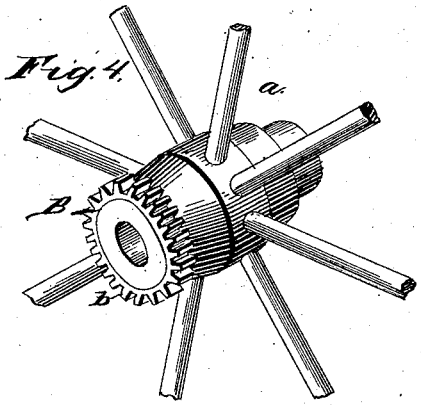
Witnesses
Geo. Thorp.
C. E. Doyle.
Inventor
J. E. Grose
By his Attorneys
C. A. Snowden

UNITED STATES PATENT OFFICE.

JOSEPH EDWIN GROSE, OF ZELA, WEST VIRGINIA.

HITCHING DEVICE FOR VEHICLES.

SPECIFICATION forming part of Letters Patent No. 372,311, dated November 1, 1887.

Application filed July 6, 1887. Serial No. 243,574. (No model.)

*To all whom it may concern:*

Be it known that I, JOSEPH EDWIN GROSE, a citizen of the United States, residing at Zela, in the county of Nicholas and State of West Virginia, have invented a new and useful Improvement in Hitching Devices, of which the following is a specification.

My invention relates to a hitching device to be attached to a vehicle, and is designed to have the driving-reins connected thereto when the horses are desired to stand, and the said device is so constructed that when the horses attempt to move forward the said reins are drawn back, thus checking the said horses.

The invention consists in a certain novel construction and arrangement of parts, fully set forth hereinafter, and specifically pointed out in the claims.

In the accompanying drawings, Figure 1 is a side view of a vehicle provided with my improved hitching device. Fig. 2 is a similar view showing the hitching device in the position seen when the vehicle is moved forward. Fig. 3 is a section on the line $xx$, Fig. 2. Fig. 4 is a detail view of one of the wheels.

Referring by letter to the drawings, A designates a vehicle having the wheels $aa$, and B designates a band secured around the inner end of the hub of one of the rear wheels, the said band being provided around the periphery with the gear-teeth $bb$, for a purpose hereinafter explained.

C designates the sliding frame of the hitching device, comprising the horizontal upper rod, D, passing through the aligned guide loops or eyes $cc$, which are secured to the side of the wagon. The said rod is bent downwardly at the front end to form the short vertical arm $D^2$, and then rearwardly at the lower end of the said arm $D^2$ to form the lower horizontal arm, D', parallel with the arm D and shorter than the same. The arm D' operates in a guide eye or bracket, $c'$, also secured to the side of the wagon and adapted to direct the horizontal motion thereof. The rear end of the arm D is provided with the eye $d$, having a vertical opening therein, and the rear end of the arm D' is provided with the ears $d'd'$, having aligned openings therein.

E designates a vertical brace-bar extending between the rear extremity of the arm D' and an intermediate point of the arm D, and the said brace is provided with a vertical slot, $e$, about the center thereof.

G designates a ratchet-bar having the teeth $g$ to mesh with the teeth $b$ on the band B, and the said bar is provided with a vertical arm, G', pivoted at the upper end between the ears $d'$ and the vertical arm $G^2$, at the opposite end from the arm G', to pass up and enter the eye $d$ on the rear end of the arm D. The upper end of the said arm $G^2$ is bent slightly, or otherwise provided with a stop, to prevent the said arm from slipping entirely out of the eye $d$.

H designates the hitching-bar, having a hook, H', on the front end, and the said bar passes through the slot $e$ in the brace-bar E, and is pivoted at the rear end to an intermediate point of the vertical arm $G^2$. The point at which the bar H is pivoted to the arm $G^2$ is above the point at which the arm G' is pivoted to the rear end of the arm D', and therefore it is evident that a forward pull upon the bar H would cause the ratchet-bar to be raised.

When it is desired to hitch a team, the driving-reins are attached to the hook H', only a very slight looseness being allowed in the said reins. If the horses attempt to move forward, the reins are drawn forward, thus sliding the bar H forward and raising the ratchet-bar into engagement with the revolving gear attached to the wheel of the wagon. The said gear acts upon the ratchet-bar, and, as it is above the said bar, draws it rearwardly, thereby moving the entire sliding frame rearwardly and checking the horses. A very slight pull upon the reins is sufficient to throw the ratchet-bar into engagement with the gear-teeth on the hub, and when said engagement is formed it is impossible for the horses to proceed forward, as the harder the said horses pull the tighter the reins are drawn backward. The effect and impression upon the horses is very much the same as if a driver was in the wagon, as when the horses attempt to move forward the reins are drawn back with a steady firm motion, resembling the checking by a driver, and when the horses stop the reins are slacked, thus carrying out the illusion.

This device may be made very inconspicuous and placed on the side of a carriage; but it was designed more especially for use on delivery-wagons, where the driver must jump out quickly to deliver a parcel, and has not the time to hitch the horse to a post or use a weight, as must ordinarily be done.

If one of my hitching devices is attached to the wagon, the driver has merely to drop the loop of the reins over the hook on the hitching-bar and the horse or horses cannot move away, as they will be checked in the manner before described.

Moreover, the device is very simple in construction and may be very cheaply manufactured.

I do not wish to limit myself strictly to the precise details of construction as herein set forth, as I may make slight changes therein without departing from the spirit and intent of the invention.

Having thus described my invention, I claim—

1. The hitching device to be attached to the side of a vehicle, comprising the sliding frame C, having the ratchet-arm pivoted to the said frame and adapted to engage with ratchet-teeth on the wheel of the vehicle, and the hitching-bar designed to have the driving-reins attached thereto and connected to the said ratchet-bar, whereby when the said hitching-bar is drawn forward the ratchet-bar is caused to engage with the said ratchet-teeth on the wheel, substantially as specified.

2. The combination, with a vehicle having a toothed band secured around the inner end of the hub of one of the wheels thereof, of the sliding frame C, comprising the upper arm, D, having the eye $d$ in the rear end, the lower arm, D′, having the parallel and perforated ears $d'$ $d'$ on the rear end thereof, and the vertical brace-bar E, secured at the ends to the said arms D and D′ and having the vertical slot $e$ therein, the ratchet-bar G, pivoted at the front end between the ears $d$ $d$ on the lower arm, D′, and having the upwardly-extending arm $G^2$ at the rear end to pass through and operate in the eye $d$ on the rear end of the arm D, and the hitching-bar H, pivoted at the rear end to the said vertical arm $G^2$, passing through the slot $e$ in the brace bar and formed at the front end with a hook, H′, to receive the loop of the driving-reins, substantially as specified.

3. The combination, with a vehicle having a wheel provided with a toothed hub, of the frame adapted to slide forward and backward on the vehicle-body, the ratchet-bar hinged to the said frame and movable therewith, and adapted, when raised, to engage with the toothed hub, and the bar H, connected to the said ratchet-bar and having a hook on the front end to receive the driving-reins, whereby when the said reins are drawn forward the ratchet-bar is raised by means of the bar H, and the rotation of the wheel causes the entire sliding frame to move rearwardly, thereby drawing rearwardly upon the said reins, substantially as specified.

4. The combination, with the vehicle having the wheels $a$, of the band B, having the gear-teeth $b$ $b$, guide eyes or loops $c$ $c$ and $c'$, secured to the side of the vehicle-body, the sliding frame C, comprising the upper arm, D, sliding in the eyes $c$ $c$ and having the eye $d$ at the rear end, the vertical arm $D^2$, depending from the front end of the arm D, the horizontal lower arm, D′, extending rearwardly from the lower end of the arm $D^2$ and having the parallel perforated ears $d'$ $d'$ on the rear end, the said arm D′ sliding in the guide-eye $c'$, and the vertical brace-bar E, disposed between the bars D D′ and having the slot $e$ therein, the ratchet-bar G, provided at the front end with the upwardly-extending arm G′, pivoted at the upper end between the ears $d'$ $d'$, and the vertical arm $G^2$ at the rear end, passing through the eye $d$ on the rear end of the arm D and having a stop thereon above the said eye to prevent its withdrawal from said eye, and the hitching-bar H, having the hook H′ on the front end, the said bar passing through the slot $e$ in the brace-bar E and pivoted at the rear end to the vertical arm $G^2$, all constructed, arranged, and operated substantially as specified.

In testimony that I claim the foregoing as my own I have hereto affixed my signature in presence of two witnesses.

JOSEPH EDWIN GROSE.

Witnesses:
Jos. A. ALDERSON,
ROBT. A. KINCAID.